(12) United States Patent
Tomitani

(10) Patent No.: US 7,133,004 B2
(45) Date of Patent: Nov. 7, 2006

(54) FLAT DISPLAY DEVICE

(75) Inventor: Hisashi Tomitani, Kanazawa (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 57 days.

(21) Appl. No.: 11/117,293

(22) Filed: Apr. 29, 2005

(65) Prior Publication Data

US 2005/0190176 A1   Sep. 1, 2005

Related U.S. Application Data

(63) Continuation of application No. PCT/JP03/13746, filed on Oct. 28, 2003.

(30) Foreign Application Priority Data

Oct. 29, 2002   (JP) .............................. 2002-314901

(51) Int. Cl.
*G09G 3/20* (2006.01)
*G09G 3/36* (2006.01)

(52) U.S. Cl. .......................... 345/58; 345/90; 345/100

(58) Field of Classification Search ............ 345/76–84, 345/87–104
See application file for complete search history.

(56) References Cited

U.S. PATENT DOCUMENTS

| | | | | |
|---|---|---|---|---|
| 5,670,973 | A * | 9/1997 | Bassetti et al. ................ | 345/58 |
| 5,691,739 | A * | 11/1997 | Kawamori et al. ........... | 345/58 |
| 5,748,169 | A * | 5/1998 | Okumura et al. ........... | 345/100 |
| 5,945,866 | A * | 8/1999 | Fonash et al. ............... | 327/427 |
| 6,020,870 | A * | 2/2000 | Takahashi et al. ............ | 345/92 |
| 6,791,525 | B1 * | 9/2004 | Matsumura et al. ......... | 345/100 |
| 6,963,321 | B1 * | 11/2005 | Everitt ......................... | 345/82 |
| 2002/0033789 | A1 * | 3/2002 | Miyata et al. ................ | 345/89 |
| 2002/0044126 | A1 * | 4/2002 | Aoki ............................ | 345/96 |
| 2002/0126076 | A1 * | 9/2002 | Itakura ........................ | 345/87 |

FOREIGN PATENT DOCUMENTS

| | | |
|---|---|---|
| JP | 4-52684 | 2/1992 |
| JP | 6-242417 | 9/1994 |
| JP | 11-119193 | 4/1999 |
| JP | 11-352464 | 12/1999 |
| JP | 2000-35593 | 2/2000 |
| JP | 2002-122880 | 4/2002 |
| JP | 2002-140043 | 5/2002 |
| JP | 2003-150080 | 5/2003 |
| JP | 2003-150127 | 5/2003 |
| JP | 2004-21069 | 1/2004 |

* cited by examiner

*Primary Examiner*—Richard Hjerpe
*Assistant Examiner*—M. Fatahiyar
(74) *Attorney, Agent, or Firm*—Oblon, Spivak, McClelland, Maier & Neustadt, P.C.

(57) ABSTRACT

A flat display device includes pixels, thin-film transistors, gate electrodes, source electrodes, storage capacitance elements, first storage capacitance electrodes, and second storage capacitance electrodes. A first compensation voltage that is applied to each of the first storage capacitance electrodes and a second compensation voltage that is applied to each of the second storage capacitance electrodes have mutually different voltage polarities. A polarity of a video signal voltage, which is applied via the source electrode to a source terminal of the thin-film transistor, which is included in the thin-film transistors connected to the same gate electrode and is connected to the first storage capacitance electrode, is set to be opposite to a polarity of a video signal voltage, which is applied via the source electrode to a source terminal of the thin-film transistor that is connected to the second storage capacitance electrode.

17 Claims, 14 Drawing Sheets

Odd-numbered frame

| + | − | + | − | + | − |
| − | + | − | + | − | + |
| + | − | + | − | + | − |
| − | + | − | + | − | + |
| + | − | + | − | + | − |
| − | + | − | + | − | + |

(a)

Even-numbered frame

| − | + | − | + | − | + |
| + | − | + | − | + | − |
| − | + | − | + | − | + |
| + | − | + | − | + | − |
| − | + | − | + | − | + |
| + | − | + | − | + | − |

Odd-numbered frame

FIG. 10A

Even-numbered frame

FIG. 10B

FLAT DISPLAY DEVICE

CROSS REFERENCE TO RELATED APPLICATIONS

This is a Continuation Application of PCT Application No. PCT/JP03/13746, filed Oct. 28, 2003, which was published under PCT Article 21(2) in Japanese.

This application is based upon and claims the benefit of priority from prior Japanese Patent Application No. 2002-314901, filed Oct. 29, 2002, the entire contents of which are incorporated herein by reference.

BACKGROUND OF THE INVENTION

1. Field of the Invention

The present invention relates to a flat display device wherein a storage capacitance element is connected to a thin-film transistor that drives a pixel.

2. Description of the Related Art

FIG. 8 is a plan view showing the structure of a prior-art flat display device 90. The flat display device 90 includes a plurality of liquid crystal portions 9 arranged substantially in a matrix, and a plurality of thin-film transistors (TFTs) 4 that are provided to drive the respective liquid crystal portions 9. Each liquid crystal portion 9 functions as a capacitive load. Each thin-film transistor 4 is an N-channel transistor.

Each thin-film transistor 4 is provided with a gate terminal 5, a source terminal 6 and a drain terminal 7. Each liquid crystal portion 9 is connected to the drain terminal 7 of the associated thin-film transistor 4.

The gate terminals 5 of the respective thin-film transistors 4 are connected to a plurality of gate electrodes 19, respectively, which are disposed to extend in a horizontal direction and spaced from each other at predetermined intervals. The source terminals 6 of the respective thin-film transistors 4 are connected to a plurality of source electrode lines 3, respectively, which are disposed to extend in a vertical direction and spaced from each other at predetermined intervals.

A storage capacitance element 8 is connected to the associated liquid crystal portion 9 and to the drain terminal of the associated thin-film transistor 4 that drives the liquid crystal portion 9. The respective liquid crystal portions 9 are connected via the storage capacitance elements 8 to a plurality of storage capacitance electrodes 91 that are disposed to extend in the horizontal direction and spaced from each other at predetermined intervals. A counter electrode 22 is provided on a side opposite to the thin-film transistors 4, with the associated liquid crystal portion 9 interposed.

A parasitic capacitance 24 exists at an intersection between each source electrode 3 and the associated gate electrode 19. A parasitic capacitance 23 exists at an intersection between each source electrode 3 and the associated storage capacitance electrode 91.

Each source electrode 3 is connected to a source electrode drive circuit 92. Each gate electrode 19 and each storage capacitance electrode 91 are connected to a scan circuit 25.

The operation of the flat display device 90 with the above structure will now be described. FIG. 9 is a waveform diagram for illustrating the operation of the flat display device 90. To begin with, the scan circuit 25 applies compensation voltages 12, 13, 14 and 15 in order to sequentially scan the storage capacitance electrodes 91. Each of the compensation voltages 12, 13, 14 and 15 has three values: a high voltage, a low voltage and an intermediate voltage. When the storage capacitance electrode 91 is not scanned, the intermediate compensation voltage of the three-level compensation voltages is applied to the storage capacitance electrode 91. When the storage capacitance electrode 91 is scanned, the high voltage and low voltage of the three-level compensation voltages are alternately applied in accordance with the polarity of the pixel voltage. In the next frame period 27, the compensation voltage of a polarity opposite to that of the compensation voltage applied in the previous frame period 27 is applied.

Subsequently, in order to turn on the thin-film transistors 4 connected to the same gate electrode 19, the scan circuit 25 sequentially applies gate drive voltages 16, 17 and 18 to the gate electrodes 19. In each of the gate drive voltages 16, 17 and 18, the high level corresponds to a voltage at which the thin-film transistor 4 is turned on. The low level corresponds to a voltage at which the thin-film transistor 4 is turned off. The gate electrodes 19 are sequentially scanned by successively shifting the pulses of the gate drive voltages 16, 17 and 18. In the next frame period 27, the pulses are shifted once again, thereby sequentially scanning the gate electrodes 19.

The source electrode drive circuit 92 applies a video signal voltage 93, which corresponds to an image to be displayed, to each source electrode 3, so as to charge each storage capacitance element 8 and each liquid crystal portion 9 to a desired voltage via the associated thin-film transistor 4. The polarity of the video signal voltage 93 alternately changes for each scan row in an order of plus, minus, plus, . . . . In the next frame period 27, the polarity alternately changes in the order of minus, plus, minus, . . . .

The scan circuit 25 sets the gate drive voltage 16 at the low level in order to turn off the thin-film transistors 4 that are connected to the same gate electrode 19. If each thin-film transistor 4 is turned off, the voltage that is charged in each storage capacitance element 8 and each liquid crystal portion 9 is retained. Subsequently, the scan circuit 25 switches the compensation voltage 12, which is applied to the storage capacitance electrode 91, to an intermediate voltage. Thereby, the compensation voltage is superimposed on the voltage that is retained in each liquid crystal portion 9, and the resultant voltage is retained as a pixel voltage. The pixel voltage is retained until the next scan. In this way, the gate lines are sequentially scanned to perform a display for the entire frame.

Upon completion of the scan for one frame, the voltage polarities of the video signal voltage and compensation voltage are reversed for AC-driving of the liquid crystal in which the polarity of the voltage retained as the pixel voltage alternately changes, and then the scan is executed again.

In general, in order to suppress flicker on a display screen, the polarity of the voltage retained as the pixel voltage is reversed on a line-by-line basis. This method is generally called "line-reversal driving."

Figures 10A, 10B:
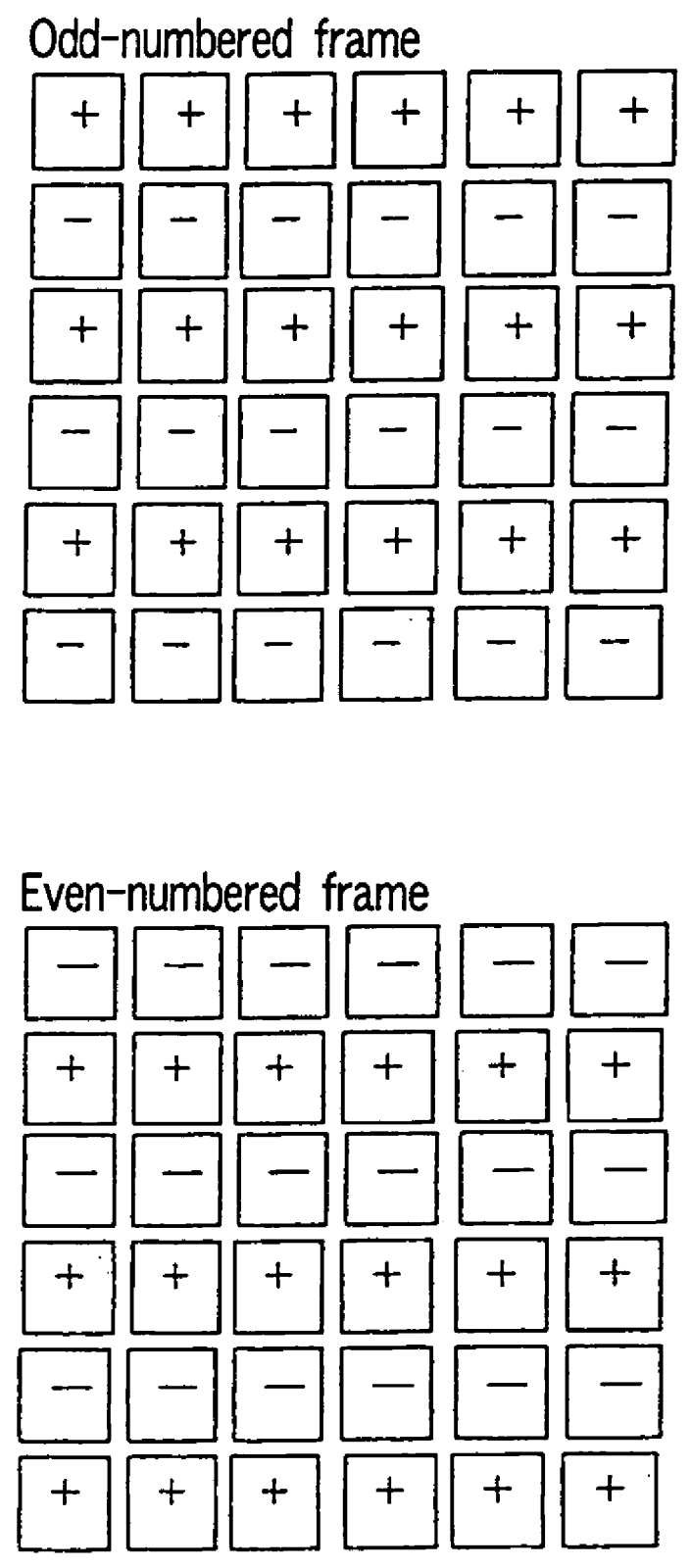

FIG. 10A is a diagram for explaining the polarity of the pixel application voltage that is applied in odd-number frames, and FIG. 10B is a diagram for explaining the polarity of the pixel application voltage that is applied in even-number frames. Each block indicates the polarity of pixel voltage of each pixel by "+" or "−". The row direction is a scan direction. In the prior-art flat display device, the polarities of the pixel voltages are equal in each row, and are different from row to row. In addition, the polarity of the voltage applied to each pixel is made different between an odd-number frame and an even-number frame, thereby AC-driving the liquid crystal.

Pixel application voltages 95, 96 and 97 having the shown waveforms are voltages applied to the liquid crystal portions that form the pixels. To begin with, a low-level compensation voltage 12 is applied to the storage capacitance electrode 91. Thereafter, when a high-level gate drive voltage 16 is applied to the gate electrode 19, the liquid crystal portion is charged with the video signal voltage 93 that is applied to the source electrode 3. Subsequently, a low-level gate drive voltage 16 is applied to the gate electrode 19 and the video signal voltage 93, which is applied to the source electrode 3, is retained by the liquid crystal portion.

Then, an intermediate-level compensation voltage 12 is applied to the storage capacitance electrode 91. Thereby, a difference voltage corresponding to a variation in the compensation voltage is superimposed on the previously retained video signal voltage, and the resultant voltage is applied to the liquid crystal portion and retained as the pixel application voltage 95.

In the next frame period 27, the video signal voltage 93 and compensation voltage 12 of different polarities are applied. Thereby, the pixel application voltage 95 of a different polarity is applied for each frame period 27 to attain AC-driving of the liquid crystal. In addition, the video signal voltage and compensation voltage of different polarities are applied for each row, thereby improving the problem of flicker.

With an increase in screen size and definition of the flat display device, a parasitic capacitance at an intersection between the source electrode and the gate electrode and a parasitic capacitance at an intersection between the source electrode and the storage capacitance electrode will increase. Moreover, wiring resistance of the source electrode, gate electrode and storage capacitance electrode will increase. Consequently, the charging time-constant of the source electrode, gate electrode and storage capacitance electrode increases, and a problem arises in that transition delay and distortion increases in the drive waveform. In particular, a remarkable increase occurs in the parasitic capacitance at the intersection between the source electrode and the storage capacitance electrode, and in the charging time-constant due to an increase in wiring resistance.

In the conventional method of driving the flat display device wherein charging for each row is executed by the video signal voltages whose polarities are changed simultaneously, the currents for charging or discharging the storage capacitance elements of the pixels for each row and the parasitic capacitances at the intersections between the source electrodes and the storage capacitance electrode simultaneously flow via the storage capacitance electrode at the time of scan. Since the storage capacitance electrode has a high wiring resistance, the currents cannot sufficiently flow, and the charging time-constant increases. Thus, transition delay in drive waveform occurs. As a result, a problem arises in that the liquid crystal portion cannot be charged with a desired pixel voltage.

Besides, even at the time of no scan, the currents for charging or discharging the parasitic capacitances at the intersections between the source electrodes and the storage capacitance electrode simultaneously flow in accordance with the video signal voltages whose polarities are simultaneously changed on a row-by-row basis. Consequently, the storage capacitance electrode, which has a high wiring resistance, cannot cause such currents to fully flow, and the charging time-constant increases. Thus, distortion in drive waveform occurs. As a result, a problem arises in that the liquid crystal portion cannot be charged with a desired pixel voltage.

Consequently, the prior-art flat display device has a problem that non-uniformity called "crosstalk" occurs laterally in a displayed image and considerably deteriorates the display quality.

The present invention has been made in order to solve the above problem, and the object of the invention is to provide a flat display device having a uniform, good display quality.
[Patent Document 1]
Jpn. Pat. Appln. KOKAI Publication No. 4-52684
[Patent Document 2]
Jpn. Pat. Appln. KOKAI Publication No. 2002-140043

BRIEF SUMMARY OF THE INVENTION

To achieve the object, there is provided a flat display device according to the present invention. This flat display device is characterized by comprising: a plurality of pixels arranged substantially in a matrix; a plurality of thin-film transistors (TFT) that are provided to drive the respective pixels; a plurality of gate electrodes that are disposed to extend in a horizontal direction, spaced from each other at predetermined intervals, and connected to gate terminals of the thin-film transistors; a plurality of source electrodes that are disposed to extend in a vertical direction, spaced from each other at predetermined intervals, and connected to source terminals of the thin-film transistors; a plurality of storage capacitance elements that are connected to drain terminals of the thin-film transistors and to the pixels; a plurality of first storage capacitance electrodes that are disposed to extend in the horizontal direction, spaced from each other at predetermined intervals, and connected to one part of the pixels via the storage capacitance elements; and a plurality of second storage capacitance electrodes that are disposed to extend in the horizontal direction, spaced from each other at predetermined intervals, and connected to the other part of the pixels via the storage capacitance elements; wherein a first compensation voltage applied to each of the first storage capacitance electrodes has a voltage polarity different from that of a second compensation voltage applied to each of the second storage capacitance electrodes; and a video signal voltage applied via the source electrode to the source terminal of the thin-film transistor which is included in the thin-film transistors connected to the same gate electrode and is connected to the first storage capacitance electrode via the storage capacitance element has a voltage polarity different from that of a video signal voltage applied via the source electrode to the source terminal of the thin-film transistor which is connected to the second storage capacitance electrode via the storage capacitance element.

To achieve the object, there is provided another flat display device according to the present invention. This flat display device is characterized by comprising: a display area that includes a plurality of pixel electrode lines arranged in a vertical direction and each having a plurality of pixel electrodes arranged in a horizontal direction; a plurality of thin-film transistors (TFT) that are provided to drive the pixels; a plurality of gate electrodes that are connected to gate terminals of the thin-film transistors and disposed substantially in parallel with each other to extend along the pixel electrode lines; a plurality of source electrodes that are connected to drain terminals of the thin-film transistors and disposed substantially in parallel with each other to extend in the vertical direction; storage capacitance elements having one ends connected to the source terminals of the thin-film transistors; and a plurality of storage capacitance element lines that are connected to the other ends of the storage capacitance elements and disposed substantially in parallel with each other to extend along the pixel electrode lines, wherein each storage capacitance element line is connected to the storage capacitance elements corresponding to the pixel electrodes that are alternately selected from different pixel electrode lines in units of a predetermined number of pixel electrodes arranged along each pixel electrode line.

BRIEF DESCRIPTION OF THE SEVERAL VIEWS OF THE DRAWING

FIG. 3A is a diagram for explaining the polarities of pixel application voltages that are applied to liquid crystal portions provided in the flat display device according to Embodiment 1, (a) representing the polarities of the pixel application voltages in an odd-number frame, and (b) representing the polarities of the pixel application voltages in an even-number frame;

FIGS. 10A and 10B are diagrams for explaining the polarity of a pixel application voltage that is applied to a liquid crystal provided in the prior-art flat display device, FIG. 10A representing the polarities of the pixel application voltages in an odd-number frame, and FIG. 10B representing the polarities of the pixel application voltages in an even-number frame.

DETAILED DESCRIPTION OF THE INVENTION

Figure 1A:
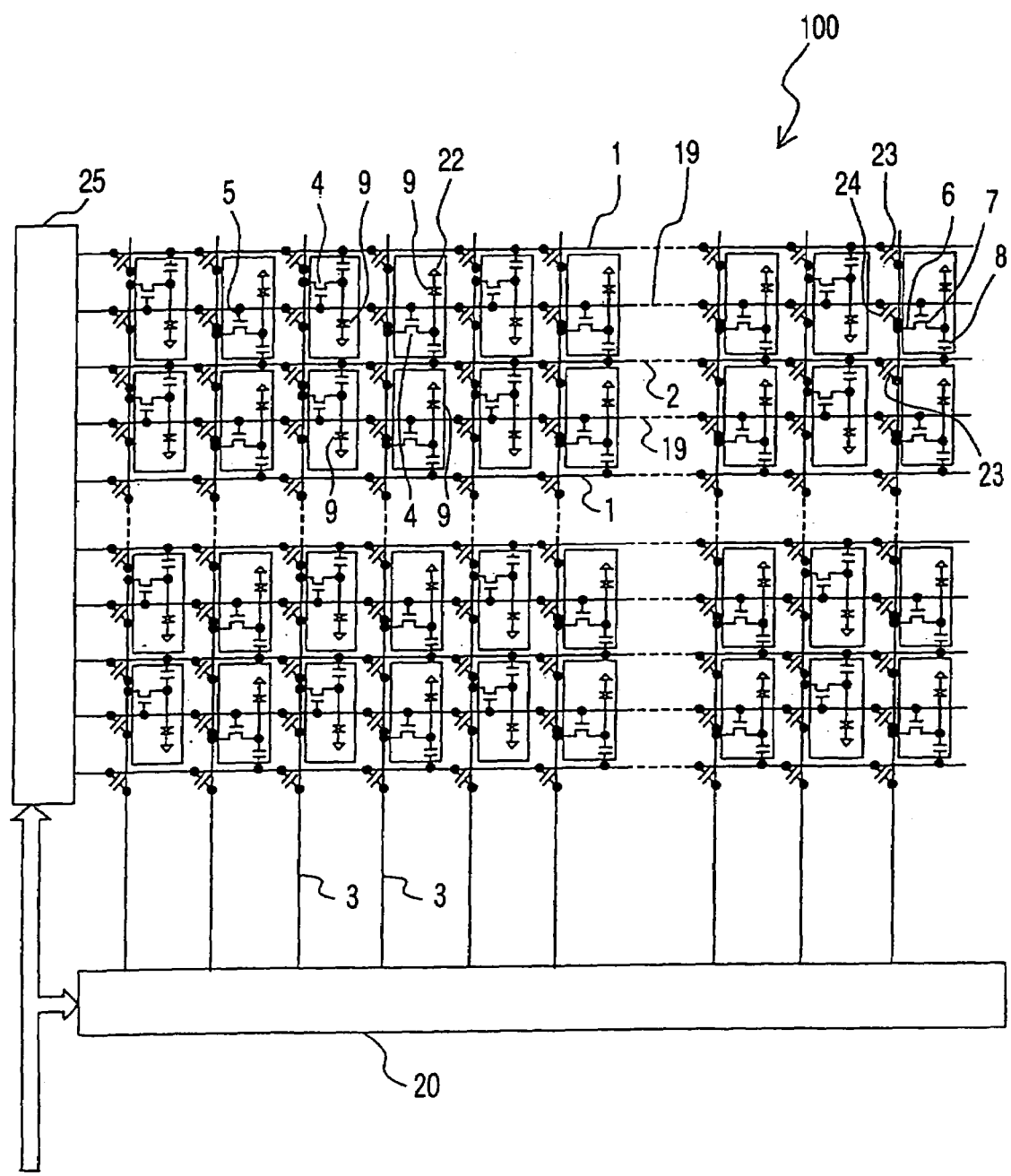
FIG. 1A is a plan view that shows the structure of a flat display device according to Embodiment 1.

In a flat display device according to an embodiment of the invention, the polarity of a video signal voltage, which is applied via a source electrode to a source terminal of a thin-film transistor, which is included in a plurality of thin-film transistors connected to the same gate electrode and is connected via a storage capacitance element to a first storage capacitance electrode, is set to be opposite to the polarity of a video signal voltage, which is applied via a source electrode to a source terminal of a thin-film transistor that is connected via a storage capacitance element to a second storage capacitance electrode. Thus, the direction of a first current, which flows through the source electrode that is connected to the source terminal of the thin-film transistor connected via the storage capacitance element to the first storage capacitance electrode, is opposite to the direction of a second current, which flows through the source electrode that is connected to the source terminal of the thin-film transistor connected via the storage capacitance element to the second storage capacitance electrode. This reduces a parasitic capacitance at an intersection, where the source electrode connected to the source terminal of the thin-film transistor connected to the first storage capacitance electrode crosses the first storage capacitance electrode, and a parasitic capacitance at an intersection, where the source electrode connected to the source terminal of the thin-film transistor connected to the second storage capacitance electrode crosses the second storage capacitance electrode. Accordingly, the transition delay of the drive waveform and the distortion of the drive waveform at the first and second storage capacitance electrodes decrease. As a result, it becomes possible to obtain a flat display device having a uniform, good display quality, without crosstalk.

Preferably, the flat display device should further include a source electrode drive circuit that is provided in order to apply a video signal voltage to each source electrode.

Preferably, the source electrode drive circuit should drive the respective source electrodes in a time-division manner.

Preferably, the source electrode drive circuit should sequentially apply video signal voltages in units of a plural number of source electrodes.

Preferably, the flat display device should further include a switch circuit that is provided to sequentially apply a video signal voltage to the source terminal of the thin-film transistor connected to the first storage capacitance electrode, and a video signal voltage to the source terminal of the thin-film transistor connected to the second storage capacitance electrode.

Preferably, the switch circuit should receive video signal voltages from the source electrode drive circuit, and sequentially apply the video signal voltages to decrease the number of times the voltage polarities of the video signal voltages are switched.

Preferably, the switch circuit should receive video signal voltages of different voltage polarities, and sequentially apply the video signal voltages under the control the source electrode drive circuit.

It is preferable that the pixels be disposed in a matrix of P-rows and Q-columns (each of P and Q is an integer of 2 or more), that the first storage capacitance electrodes be disposed to have connections with the pixels arranged in the 2N-th row ($1 \leq N \leq (P-1)/2$) and with the pixels arranged in the (2N+1)-th row, and that the second storage capacitance electrodes be disposed to have connections with the pixels arranged in the (2N-1)-th row and to the pixels arranged in the 2N-th row.

Preferably, each storage capacitance element line should be connected to the storage capacitance elements corresponding to the pixel electrodes that are alternately selected from different pixel electrode lines in units of a single pixel electrode along each pixel electrode line.

Preferably, each storage capacitance element line should be connected to the storage capacitance elements that correspond to the pixel electrodes that are alternately selected from different pixel electrode lines sides in units of a plurality of pixel electrodes along each pixel electrode line.

Preferably, voltage signals of different voltage polarities should be applied to mutually adjacent ones of the storage capacitance element lines.

Preferably, the voltage signal should be a voltage signal for CC-driving the pixel electrodes.

Preferably, each storage capacitance element line should be disposed between mutually adjacent pixel electrode lines.

Preferably, the gate electrode should be disposed on the lower side of the pixel electrode.

Preferably, the pixel electrode should be disposed over the thin-film transistor via an interlayer insulation film.

It is preferable that the plat display device further comprise a correction circuit that corrects input video data, and that the correction circuit comprise a look-up table that receives the input video data and generates corrected video data on the basis of a table in which a predetermined function is set to correct non-uniformity in gradations for the input video data; a column counter that is reset by a horizontal sync signal and generates an odd-number column/even-number column discrimination signal by counting a dot clock for transferring the input video data; and a selector that selects the corrected video data generated in the look-up table or the input video data, on the basis of the odd-number column/even-number column discrimination signal that is supplied from the column counter, and supplies the selected data to the source electrode drive circuit that is provided to drive the source electrodes.

Embodiments of the present invention will now be described with reference to the accompanying drawings.

(Embodiment 1)

Figure 1B:
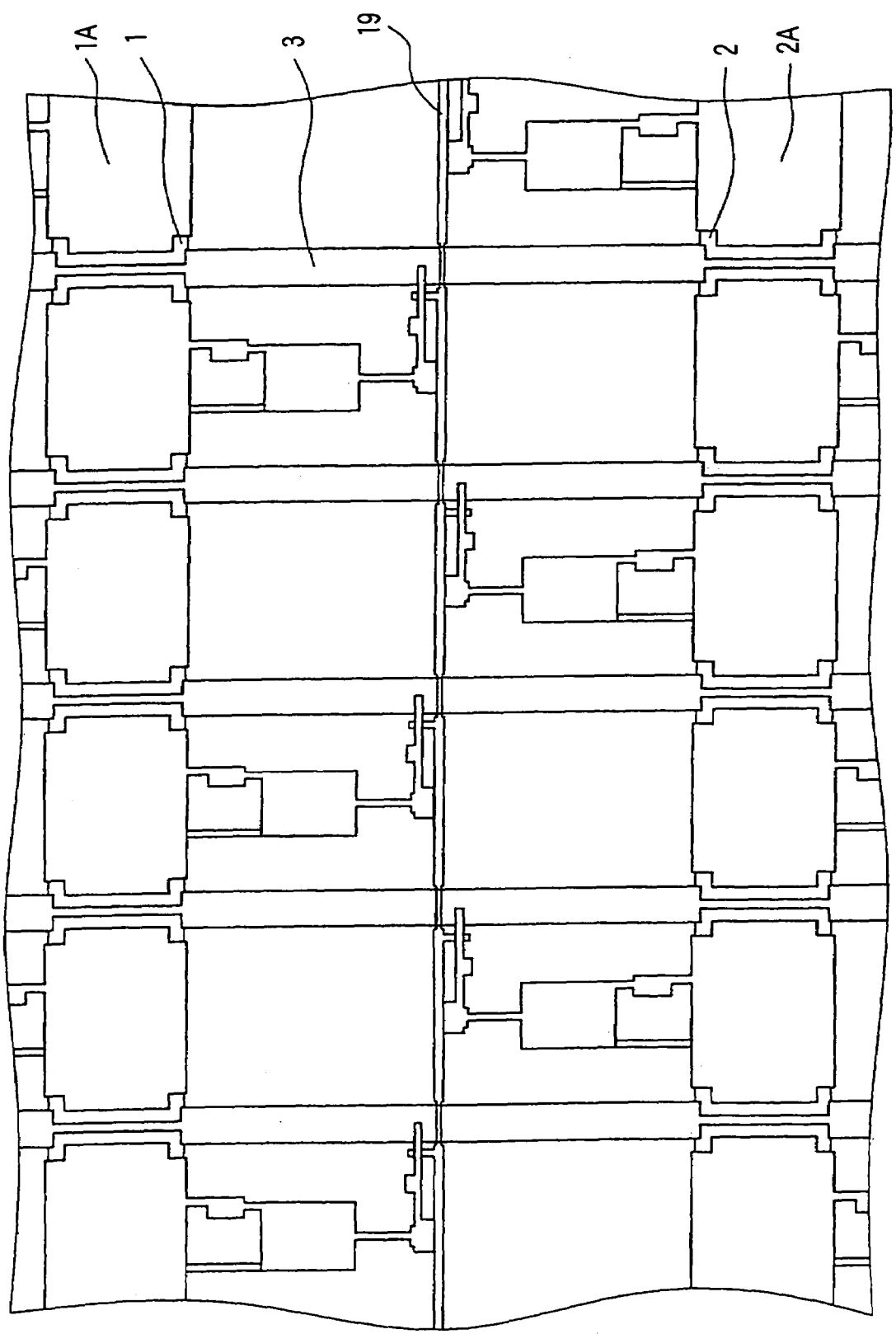
FIG. 1B is a plan view that shows a main part of the flat display device according to Embodiment 1.

FIG. 1A is a plan view that shows the structure of a flat display device 100 according to Embodiment 1, and FIG. 1B is a plan view that shows a main part of the flat display device 100. The flat display device 100 comprises a plurality of liquid crystal portions 9 arranged in a matrix of P-rows/Q-columns (each of P and Q is an integer of 2 or more), and a plurality of thin-film transistors 4 (TFT) that are provided in order to drive the liquid crystal portions 9. Each liquid crystal portion 9 functions as a capacitive load. Each thin-film transistor 4 is an N-channel transistor. The liquid crystal portion 9 is disposed over the thin-film transistor 4 via an interlayer insulation film.

Each thin-film transistor 4 is provided with a gate terminal 5, a source terminal 6 and a drain terminal 7. Each liquid crystal portion 9 is connected to the drain terminal 7 of the associated thin-film transistor 4.

The gate terminals 5 of the respective thin-film transistors 4 are connected to a plurality of gate electrodes 19, respectively, which are disposed in a horizontal direction and spaced from each other at predetermined intervals. The gate electrode 19 is disposed on the lower side of the liquid crystal portion 9. The source terminals 6 of the respective thin-film transistors 4 are connected to a plurality of source electrodes 3, respectively, which are disposed in a vertical direction and spaced from each other at predetermined intervals.

A storage capacitance element 8 is connected to the associated liquid crystal portion 9 and the drain terminal of the associated thin-film transistor 4 that drives the liquid crystal portion 9. The respective liquid crystal portions 9, which are disposed in an odd-number column, are connected via the storage capacitance elements 8 to a plurality of storage capacitance electrodes (storage capacitance lines) 1 that are disposed in the horizontal direction and spaced from each other at predetermined intervals. The respective liquid crystal portions 9, which are disposed in an even-number column, are connected via the storage capacitance elements 8 to a plurality of storage capacitance electrodes (storage capacitance lines) 2 that are disposed in the horizontal direction and spaced from each other at predetermined intervals. A counter electrode 22 is provided on a side opposite to the associated thin-film transistor 4, with the associated liquid crystal portion 9 interposed. Storage capacitance pads 1A and 2A are provided on each storage capacitance line 1 and each storage capacitance line 2.

Each storage capacitance electrode 1 is disposed so as to be connected to the liquid crystal portions 9 disposed in a 2N-th row ($1 \leq N \leq (P-1)/2$) and to the liquid crystal portions 9 disposed in a (2N+1)-th row. Each storage capacitance electrode 2 is disposed to have connections with the liquid crystal portions 9 disposed in the (2N−1)-th row and the liquid crystal portions 9 disposed in the 2N-th row.

A parasitic capacitance 24 is provided at an intersection between each source electrode 3 and each associated gate electrode 19. A parasitic capacitance 24 is provided at an intersection between each source electrode 3 and each of the associated storage capacitance electrodes 1 and storage capacitance electrodes 2.

Each source electrode 3 is connected to a source electrode drive circuit 20. Each gate electrode 19, each storage capacitance electrode 1 and each storage capacitance electrode 2 are connected to a scan circuit 25.

As described above, the storage capacitance element lines 1 and 2 are connected to the storage capacitance elements 8 that correspond to the liquid crystal portions 9, which are arranged on different pixel electrode line sides in units of a single liquid crystal portion 9 along the pixel electrode lines in which the liquid crystal portions 9 are disposed in the horizontal direction.

Figure 2:
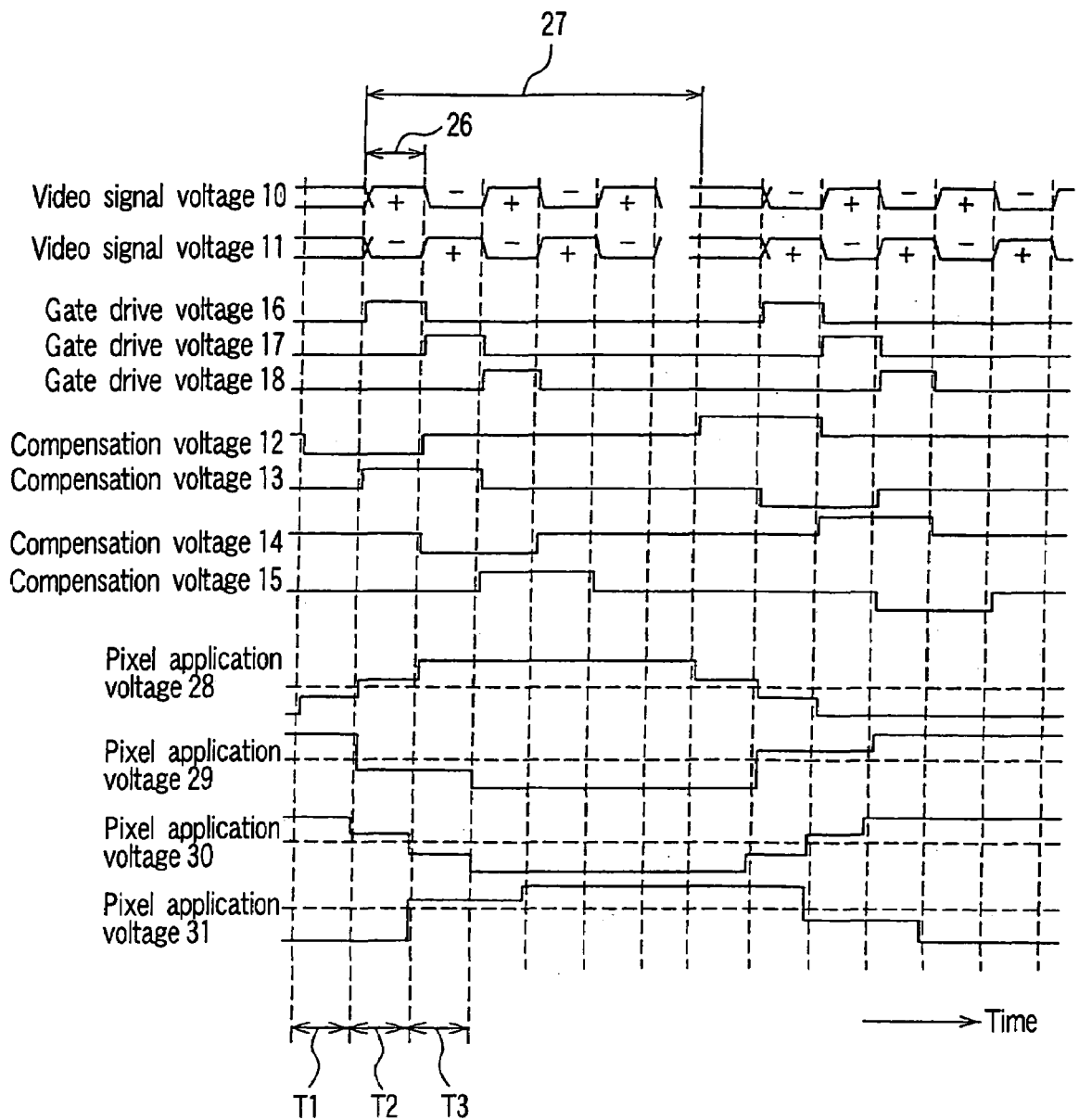
FIG. 2 is a waveform diagram for explaining the operation of the flat display device according to Embodiment 1.

The operation of the flat display device 100 with the above structure will now be described. FIG. 2 is a waveform diagram for illustrating the operation of the flat display device 100.

Referring to FIG. 1A, FIG. 1B and FIG. 2, the polarity of a video signal voltage 10, which is applied, via the source electrode 3 in an odd-number column, to the source terminal 6 of the thin-film transistor 4 that is connected via the storage capacitance element 8 to the storage capacitance electrode 1, alternately changes for each horizontal sync period 26. Like the video signal voltage 10, the polarity of a video signal voltage 11, which is applied, via the source electrode 3 in an even-number column, to the source terminal 6 of the thin-film transistor 4 that is connected via the storage capacitance element 8 to the storage capacitance electrode 2, alternately changes for each horizontal sync period 26. The video signal voltage 10 and video signal voltage 11 have mutually different voltage polarities in the same horizontal sync period 26.

The video signal voltages 10 are applied to the source electrodes 3 in the odd-number columns. The video signal voltages 11 are applied to the source electrodes 3 in the even-number columns. Thus, the number of source electrodes 3, to which the video signal voltages 10 are applied, and the number of source electrodes 3, to which the video signal voltages 11 are applied, are set on an approximately fifty-fifty basis.

As for the compensation voltage 12 applied to the storage capacitance electrode 1, the compensation voltage 13 applied to the storage capacitance electrode 2, the compensation voltage 14 applied to the other storage capacitance electrode 1 and the compensation voltage 15 applied to the other storage capacitance electrode 2, their voltage polarities are reversed on a line-by-line basis for scanning. The voltage polarities of the compensation voltage 12, compensation voltage 13, compensation voltage 14 and compensation voltage 15 are reversed from frame period 27 to frame period 27.

The voltage polarities of the pixel application voltage 28, pixel application voltage 29, pixel application voltage 30 and pixel application voltage 31, which are applied to the liquid crystal portions 9 that form the pixels in one line, are varied from line to line. In order that the respective liquid crystal portions 9 may execute an effective-value response, the pixel application voltage 28, pixel application voltage 29, pixel application voltage 30 and pixel application voltage 31 are made to have equal voltage effective values.

The gate drive voltage 16, gate drive voltage 17 and gate drive voltage 18, which are applied to the respective gate electrodes 19 that are disposed to extend in the horizontal direction, spaced from each other at predetermined intervals, and connected to the gate terminals 5 of the respective thin-film transistors 4, are successively turned on for each horizontal sync period 26.

If the gate drive voltage 16 is turned on between a time period T1 and a time period T2, the video signal voltage 10 and video signal voltage 11 are applied to the storage capacitance elements 8 and liquid crystal portions 9 via the thin-film transistors 4 whose gate terminals 5 are supplied with the gate drive voltage 16.

Next, if the compensation voltage 12 rises from the low level to the intermediate level between the time period T2 and a time period T3, a difference voltage of the compensation voltage 12 is superimposed on the pixel application voltage 28 that is applied to the liquid crystal portion 9 that forms the pixel. The voltage value of the pixel application voltage 28, on which the difference voltage of the compensation voltage 12 is superimposed, is retained.

Figure 3A:
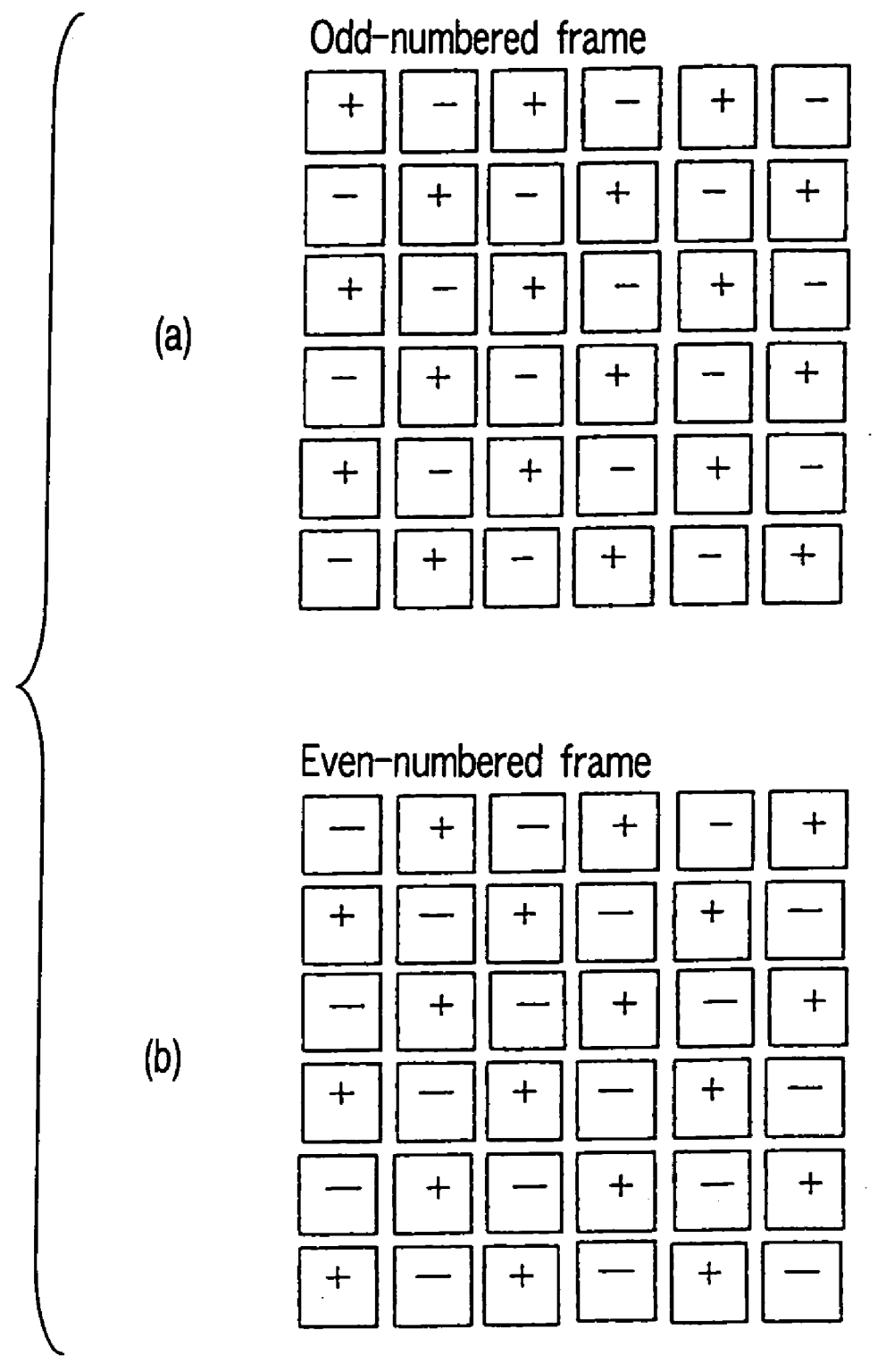

FIG. 3A is a schematic diagram for explaining the polarities of the pixel application voltages that are applied to the liquid crystal portions 9 provided in the flat display device 100. In FIG. 3A, (a) represents the polarities of the pixel application voltages applied in the odd-number frame, (b) represents the polarities of the pixel application voltages applied in the even-number frame. The polarity of the pixel application voltage varies from row to row, and from column to column. In addition, in order to AC-drive the liquid crystal portions between the odd-number frame and even-number frame, the polarity of the pixel application voltage is reversed between the odd-number frame and even-number frame.

As has been described above, the video signal voltage 10 and video signal voltage 11 have mutually opposite voltage polarities in the same horizontal sync period 26. The number of source electrodes 3, to which the video signal voltages 10 are applied, and the number of source electrodes 3, to which the video signal voltages 11 are applied, are set at an approximately fifty-fifty ratio.

Figure 3B:
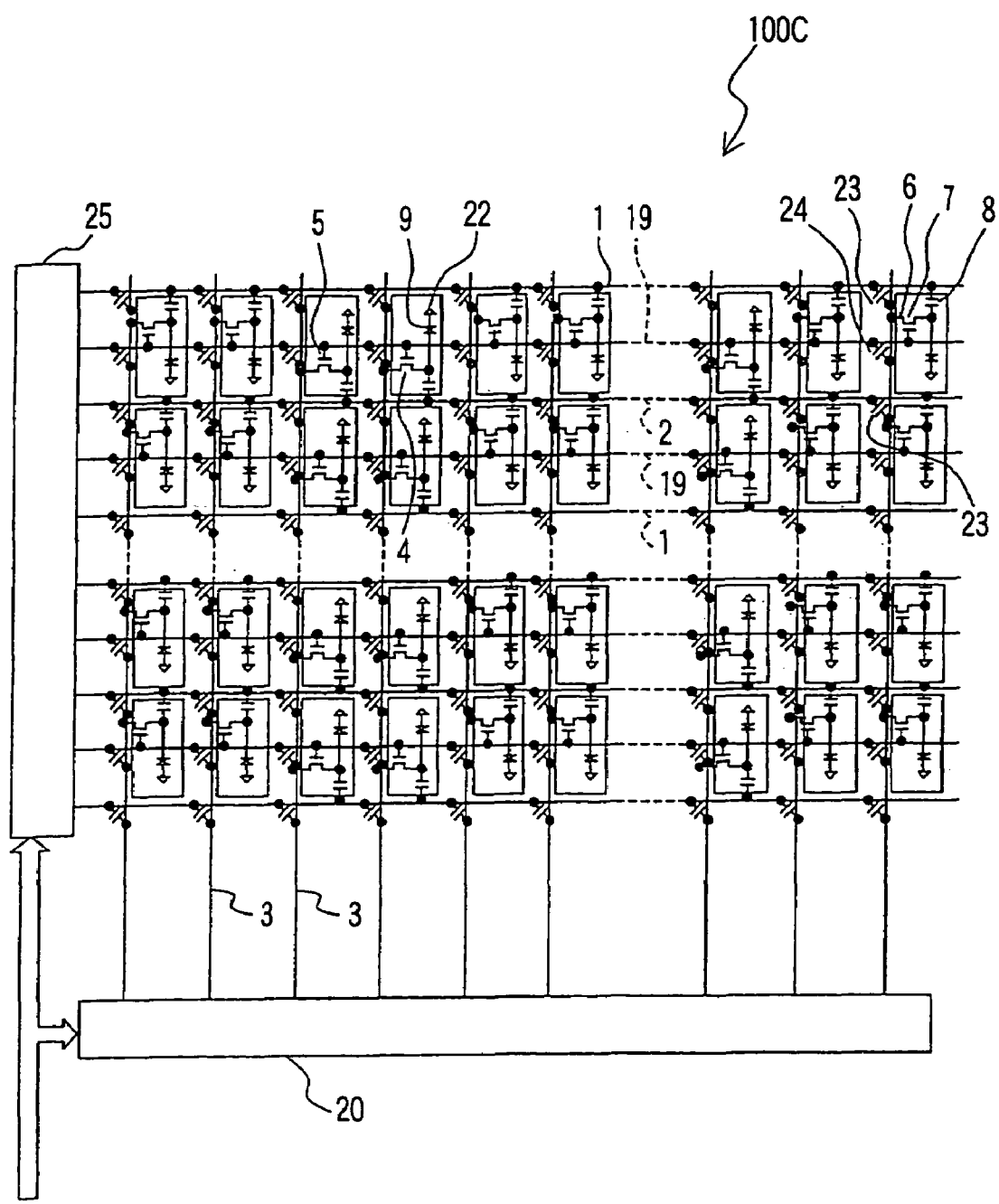
FIG. 3B is a plan view that shows the structure of another flat display device according to Embodiment 1.

FIG. 3B is a plan view that shows the structure of another flat display device 100C according to Embodiment 1. In the flat display device 100 described referring to FIG. 1, the storage capacitance element lines 1 and 2 are connected to the storage capacitance elements 8 that correspond to the liquid crystal portions 9, which are disposed on the different pixel electrode line sides in units of a single liquid crystal portion 9 along the pixel electrode lines in which the liquid crystal portions 9 are arranged in the horizontal direction. However, the present invention is not limited to this configuration. As is shown in FIG. 3B, the storage capacitance element lines 1 and 2 may be connected to the storage capacitance elements 8 that correspond to the liquid crystal portions 9, which are disposed on the different pixel electrode line sides in units of two liquid crystal portions 9 along the pixel electrode lines.

Figure 3C:
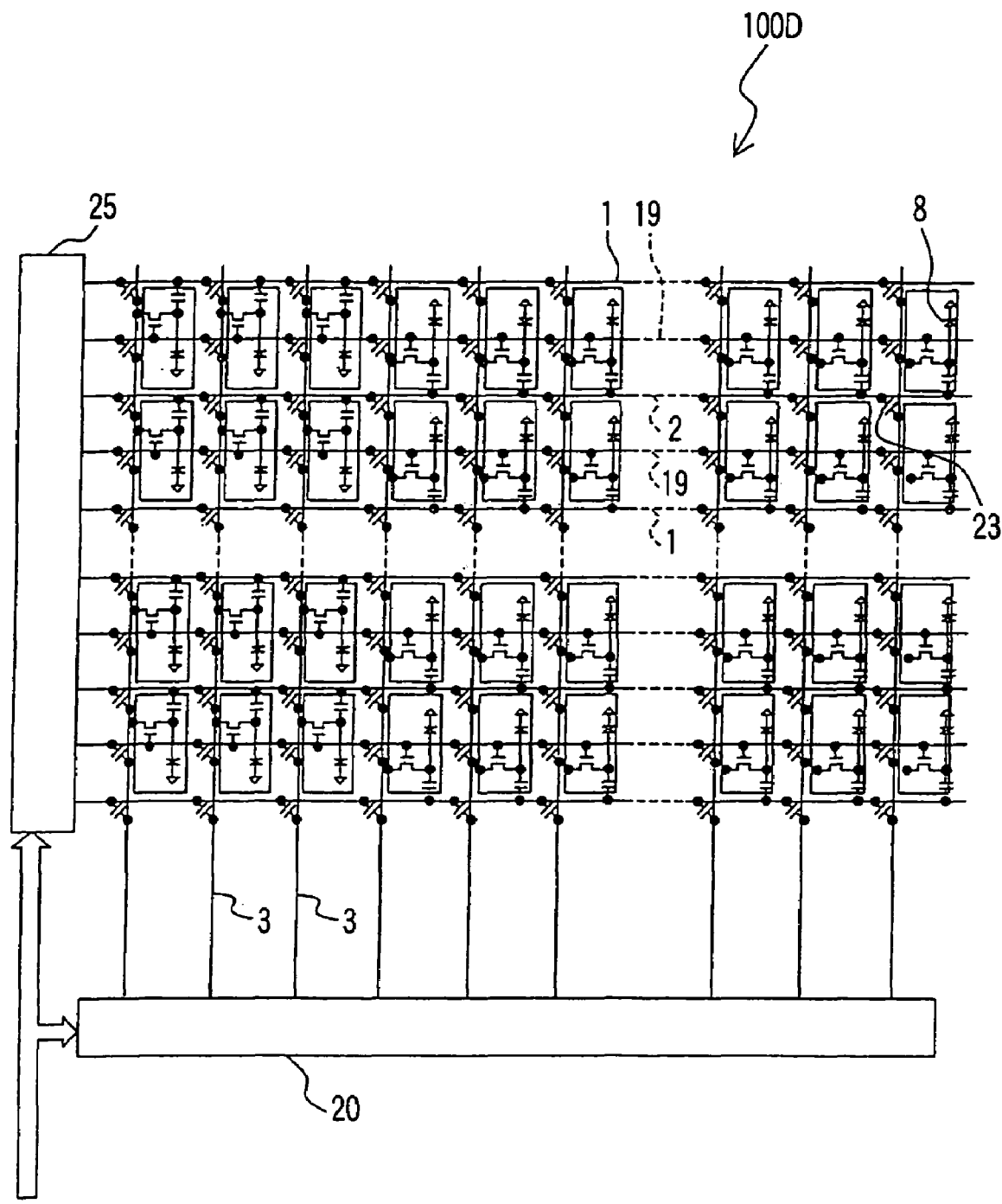
FIG. 3C is a plan view that shows the structure of still another flat display device according to Embodiment 1.

FIG. 3C is a plan view that shows the structure of still another flat display device 100D according to Embodiment 1. As is shown in FIG. 3C, the storage capacitance element lines 1 and 2 may be connected to the storage capacitance elements 8 that correspond to the liquid crystal portions 9, which are disposed on the different pixel electrode line sides in units of three liquid crystal portions 9 along the pixel electrode lines.

It should suffice, as described above, if the storage capacitance element lines 1 and 2 are connected to the storage capacitance elements 8 that correspond to the liquid crystal portions 9, which are disposed on the different pixel electrode line sides in units of a predetermined number of liquid crystal portions 9 along the pixel electrode lines.

Figure 3D:
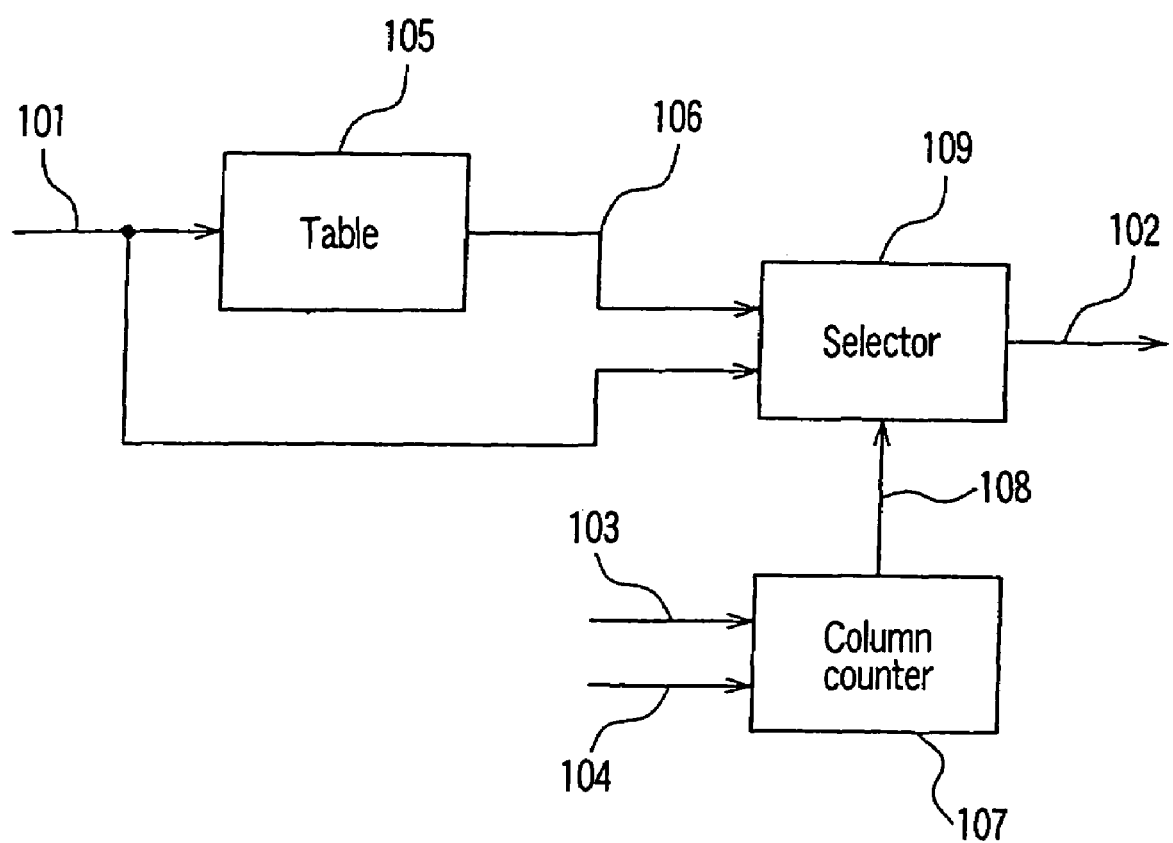
FIG. 3D is a block diagram that shows the structure of a correction circuit provided in the flat display device according to Embodiment 1.

FIG. 3D is a block diagram that shows the structure of a correction circuit provided in the flat display device according to Embodiment 1. The correction circuit is provided in order to correct the effective voltage difference between the upper and lower pixels, which are CCDI-driven, by varying the source gradation voltage.

The correction circuit includes a look-up table 105 for lower pixels (post-write). The look-up table 105 receives input digital video data 101 that is input to the flat display device 100 and generates corrected video data 106 on the basis of a table in which a predetermined function is set to correct non-uniformity in gradations for the input video data.

The correction circuit includes a column counter 107. The column counter 107 is reset by a horizontal sync signal 104. The column counter 107 counts a dot clock 103 for transferring digital video data, and supplies an odd-number column/even-number column discrimination signal 108 to a selector 109. The odd-number column and even-number column of the pixel columns correspond to upper pixels (pre-write) and lower pixels (post-write) in the pixel layout.

The selector 109 selects either the corrected video data 106 generated by the look-up table 105 or the input digital video data 101, on the basis of the odd-number column/even-number column discrimination signal 108 that is supplied from the column counter 107. The selector 109 outputs the selected data as output video data 102, and delivers it to the source electrode drive circuit provided in the flat display device 100.

In the case of the upper pixel (pre-write), the selector 109 selects the input digital video data 101 and outputs it as output video data 102. In the case of the lower pixel (post-write), the selector 109 outputs the corrected video data 106, which is computed by a predetermined arithmetic operation, as output video data 102 alternately for each column, and supplies it to the source electrode drive circuit. The above-mentioned predetermined arithmetic operation is an operation for quantizing an 8-bit input video data, which is given by $$y=f(x), y=x, (0 \leq x < 32),$$

$$y=x-1, (32 < x \leq 255) \quad \text{(Equation 1)}$$

If linear interpolation, etc. is used for correction with high precision, a greater effect can be obtained.

As described above, if the difference in effective voltage between the upper and lower pixels is corrected by giving a predetermined difference to the source gradation voltage, non-uniformity in display gradations for each column can be improved and uniform display can be obtained.

According to the above-described Embodiment 1, the polarity of a video signal voltage 10 applied via the source electrode 3 to the source terminal of a thin-film transistor 4, which is included in a plurality of thin-film transistors 4 connected to the same gate electrode 19 and is connected via the storage capacitance element 8 to the storage capacitance electrode 1, is set to be opposite to the polarity of a video signal voltage 11 applied via the source electrode 3 to the source terminal 6 of a thin-film transistor 4 that is connected via the storage capacitance element 8 to the storage capacitance electrode 2.

Thus, the direction of a current, which flows through the source electrode 3 that is connected to the source terminal 6 of the thin-film transistor 4 connected via the storage capacitance element 8 to the storage capacitance electrode 1, is opposite to the direction of a current, which flows through the source electrode 3 that is connected to the source terminal 6 of the thin-film transistor 4 connected via the storage capacitance element 8 to the storage capacitance electrode 2.

This reduces a parasitic capacitance 23 at an intersection, where the source electrode 3 connected to the source terminal 6 of the thin-film transistor 4 connected to the storage capacitance electrode 1 crosses the storage capacitance electrode 1, and a parasitic capacitance at an intersection, where the source electrode 3 connected to the source terminal 6 of the thin-film transistor 4 connected to the storage capacitance electrode 2 crosses the storage capacitance electrode 2. Accordingly, the transition delay of the drive waveform and the distortion of the drive waveform at the storage capacitance electrode 1 and the storage capacitance electrode 2 decrease.

Moreover, the direction of the current flowing to the parasitic capacitance 23, which is connected to the source electrode 3 that is supplied with the video signal voltage 10, is opposite to the direction of the current flowing to the parasitic capacitance 23, which is connected to the source electrode 3 that is supplied with the video signal voltage 11. Both currents cancel each other, and thus a distortion in the drive voltage disappears in the storage capacitance electrode 1 and storage capacitance electrode 2, which are connected to the parasitic capacitance 23.

As a result, it becomes possible to obtain a flat display device having a uniform, good display quality, without crosstalk.

(Embodiment 2)

Figure 4:
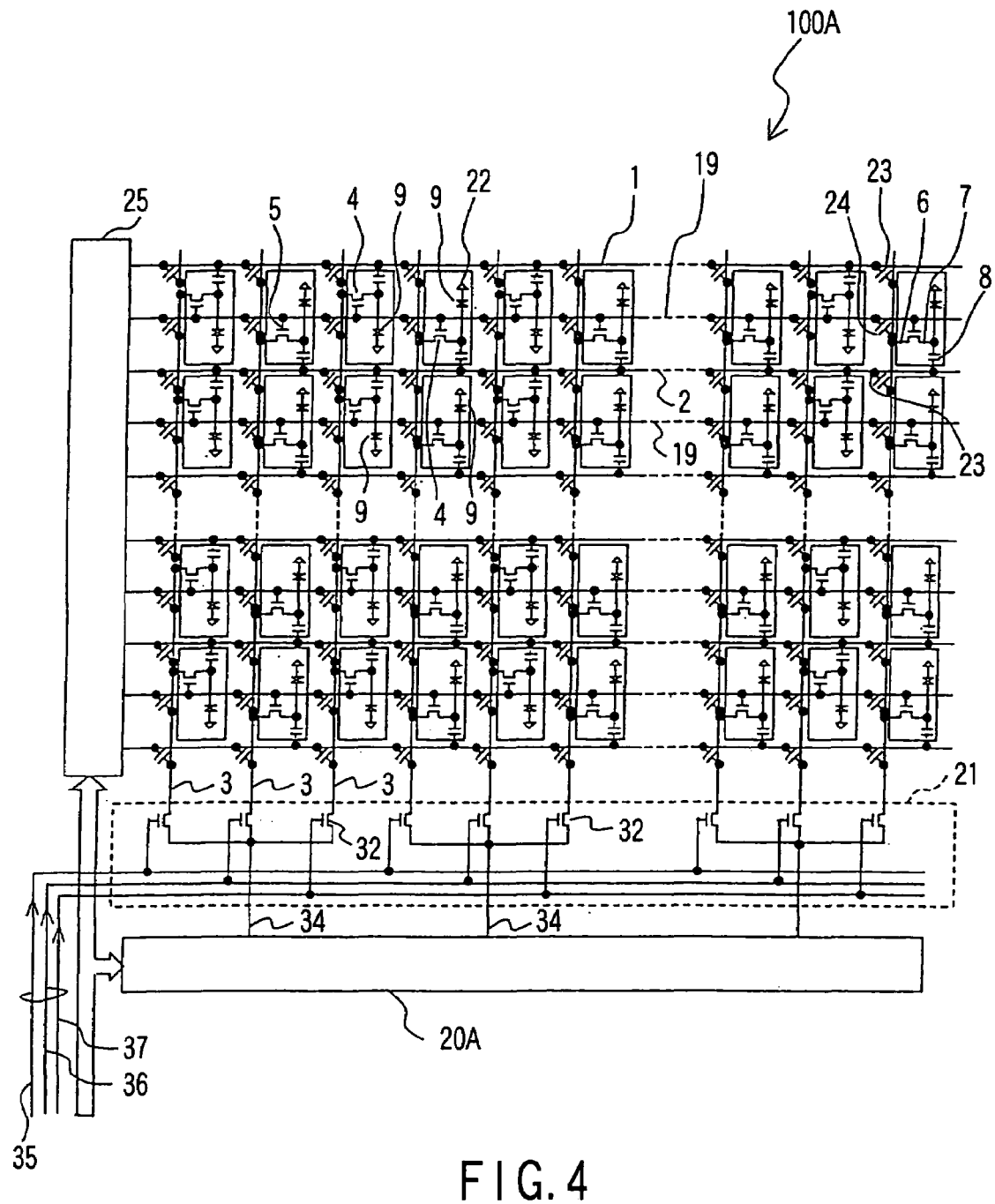
FIG. 4 is a plan view that shows the structure of a flat display device according to Embodiment 2.

FIG. 4 is a plan view showing the structure of a flat display device 100A according to Embodiment 2. The structural components, which coincide with those of the flat display device 100 described in connection with Embodiment 1 with reference to FIG. 1, are denoted by the same reference numerals. Thus, a detailed description of these structural components is omitted. The flat display device 100A differs from the previously described flat display device 100 in that a switch circuit 21 is further provided, and that the source electrode drive circuit 20 is replaced with a source electrode drive circuit 20A.

The switch circuit 21 is provided to sequentially apply a video signal voltage to the source terminal 6 of the thin-film transistor that is connected to the storage capacitance electrode 1, and a video signal voltage to the source terminal 6 of the thin-film transistor that is connected to the storage capacitance electrode 2.

The switch circuit 21 is provided with a plurality of transistors 32 for applying video signal voltages to the respective source electrodes 3. The drain terminal of each transistor 32 is connected to the associated source electrode 3.

The source terminals of the transistors 32 are configured such that the source terminals of three transistors 32 that are connected to mutually adjacent three source electrodes 3 are commonly connected to a video signal voltage supply line 34 that is connected to the source electrode drive circuit 20A. In this way, each three source electrodes 3 are connected to a single video signal voltage supply line 34.

The gate terminal of one of the three transistors 32, which are connected to the mutually adjacent three source electrodes 3, is connected to a switch circuit control signal line for supplying a switch circuit control signal 35. The gate terminal of another of the three transistors 32, which are connected to the mutually adjacent three source electrodes 3, is connected to a switch circuit control signal line for supplying a switch circuit control signal 36. The gate terminal of the other of the three transistors 32, which are connected to the mutually adjacent three source electrodes 3, is connected to a switch circuit control signal line for supplying a switch circuit control signal 37.

Figure 5:
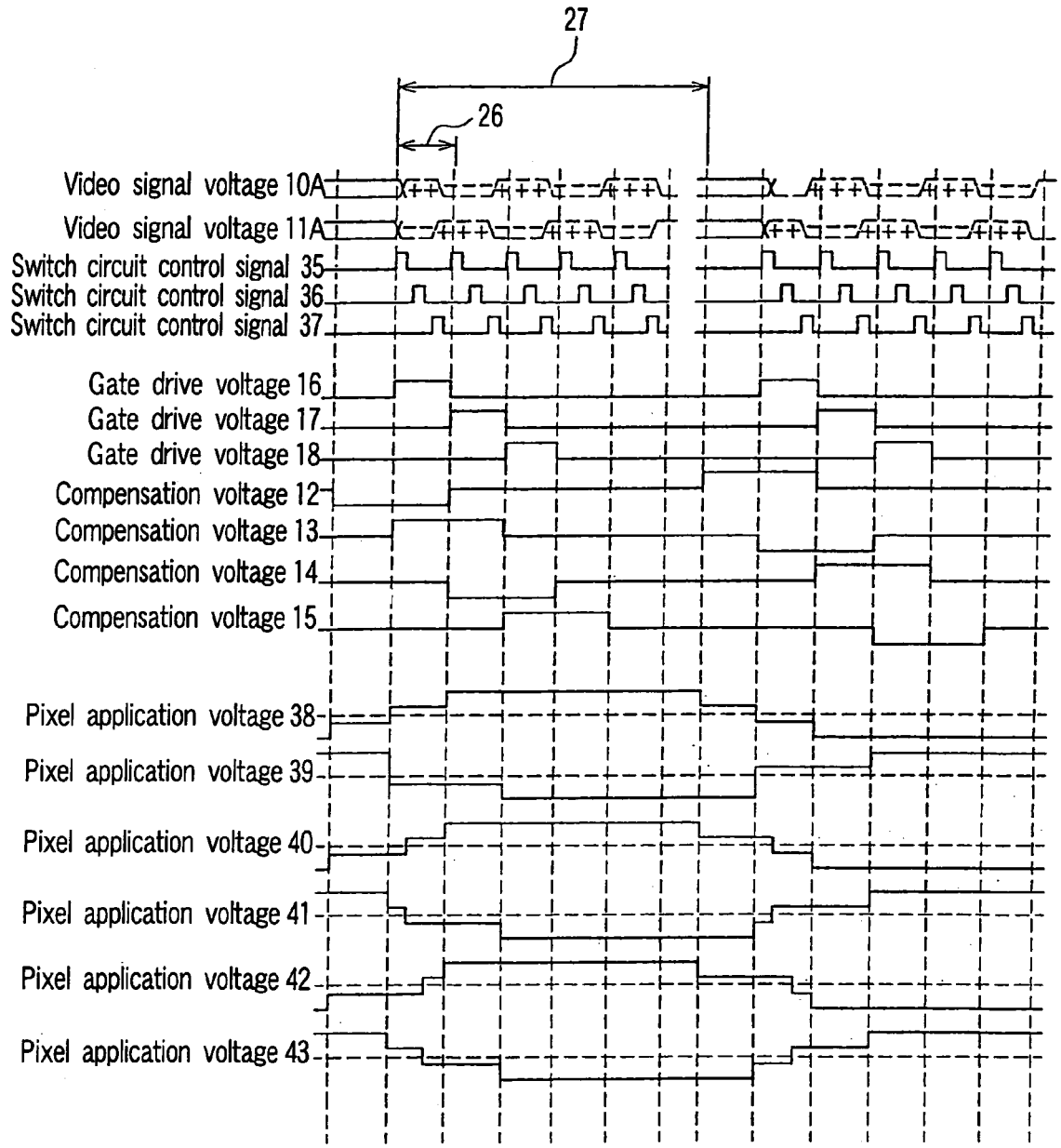
FIG. 5 is a waveform diagram for explaining the operation of the flat display device according to Embodiment 2.

FIG. 5 is a waveform diagram for illustrating the operation of the flat display device 100A. The structural components, which coincide with those in the above-described waveform diagram of FIG. 2, are denoted by the same reference numerals. Thus, a detailed description of these structural components is omitted.

Referring to FIG. 4 and FIG. 5, the polarity of a video signal voltage 10A, which is applied, via the source electrode 3 in an odd-number column, to the source terminal 6 of the thin-film transistor 4 that is connected via the storage capacitance element 8 to the storage capacitance electrode 1, alternately changes for each time period that is equal in length to the horizontal sync period 26. Like the video signal voltage 10A, the polarity of a video signal voltage 11A, which is applied, via the source electrode 3 in an even-number column, to the source terminal 6 of the thin-film transistor 4 that is connected via the storage capacitance element 8 to the storage capacitance electrode 2, alternately changes for each time period that is equal in length to the horizontal sync period 26. The video signal voltage 10A and video signal voltage 11A have mutually different voltage polarities.

The switch circuit control signal 35, switch circuit control signal 36, and switch circuit control signal 37 are associated for time-division drive (multiplex drive) of the source electrodes 3. Specifically, the switch circuit control signal 35 is first turned on during the horizontal sync period 26. After the switch circuit control signal 35 is turned off, the switch circuit control signal 36 is then turned on. After the switch circuit control signal 36 is turned off, the switch circuit control signal 37 is then turned on. Thus, the transistors 32 connected to the mutually adjacent three source electrodes 3 are sequentially turned on. Accordingly, the video signal voltages, which are supplied from the source electrode drive circuit 20A via the video signal voltage supply line 34, are sequentially applied to the mutually adjacent three source electrodes 3.

The video signal voltages 10A are applied to the source electrodes 3 in the odd-number columns. The video signal voltages 11A are applied to the source electrodes 3 in the even-number columns. Thus, the number of source electrodes 3, to which the video signal voltages 10A are applied, and the number of source electrodes 3, to which the video signal voltages 11A are applied, are set on an approximately fifty-fifty basis.

As for the compensation voltage 12 applied to the storage capacitance electrode 1, the compensation voltage 13 applied to the storage capacitance electrode 2, the compensation voltage 14 applied to the other storage capacitance electrode 1 and the compensation voltage 15 applied to the other storage capacitance electrode 2, their voltage polarities are reversed on a line-by-line basis for scanning. The voltage polarities of the compensation voltage 12, compensation voltage 13, compensation voltage 14 and compensation voltage 15 are reversed from frame period 27 to frame period 27.

The voltage polarities of the pixel application voltage 38, pixel application voltage 39, pixel application voltage 40, pixel application voltage 41, pixel application voltage 42 and pixel application voltage 43, which are applied to the liquid crystal portions 9 that form the pixels in one line, are varied from line to line. In order that the respective liquid crystal portions 9 may execute an effective-value response, the pixel application voltage 38, pixel application voltage 39, pixel application voltage 40, pixel application voltage 41, pixel application voltage 42 and pixel application voltage 43, are made to have equal voltage effective values.

The gate drive voltage 16, gate drive voltage 17 and gate drive voltage 18, which are applied to the respective gate electrodes 19 that are disposed to extend in the horizontal direction, spaced from each other at predetermined intervals, and connected to the gate terminals 5 of the respective thin-film transistors 4, are successively turned on for each horizontal sync period 26.

If the gate drive voltage 16 is turned on, the video signal voltage 10A and video signal voltage 11A are applied to the storage capacitance elements 8 and liquid crystal portions 9 via the thin-film transistors 4 that have the gate terminals 5 supplied with the gate drive voltage 16.

Next, if the compensation voltage 12 rises from the low level to the intermediate level, a difference voltage of the compensation voltage 12 is superimposed on the pixel application voltage 38 that is applied to the liquid crystal portion 9 that forms a pixel. The voltage value of the pixel application voltage 38, on which the difference voltage of the compensation voltage 12 is superimposed, is retained.

According to the above-described Embodiment 2, the switch circuit 21 receives the video signal voltages from the source electrode drive circuit 20A and applies the video signal voltages to the source electrodes 3 to decrease the number of times the voltage polarities of the video signal voltages are switched. Accordingly, an unnecessary variation in waveform is lessened in the video signal voltages that are output from the source electrode drive circuit 20A. Therefore, the transition delay of the drive waveform and the distortion of the drive waveform decrease. As a result, it becomes possible to obtain a flat display device having a uniform, good display quality, without crosstalk.

(Embodiment 3)

Figure 6:
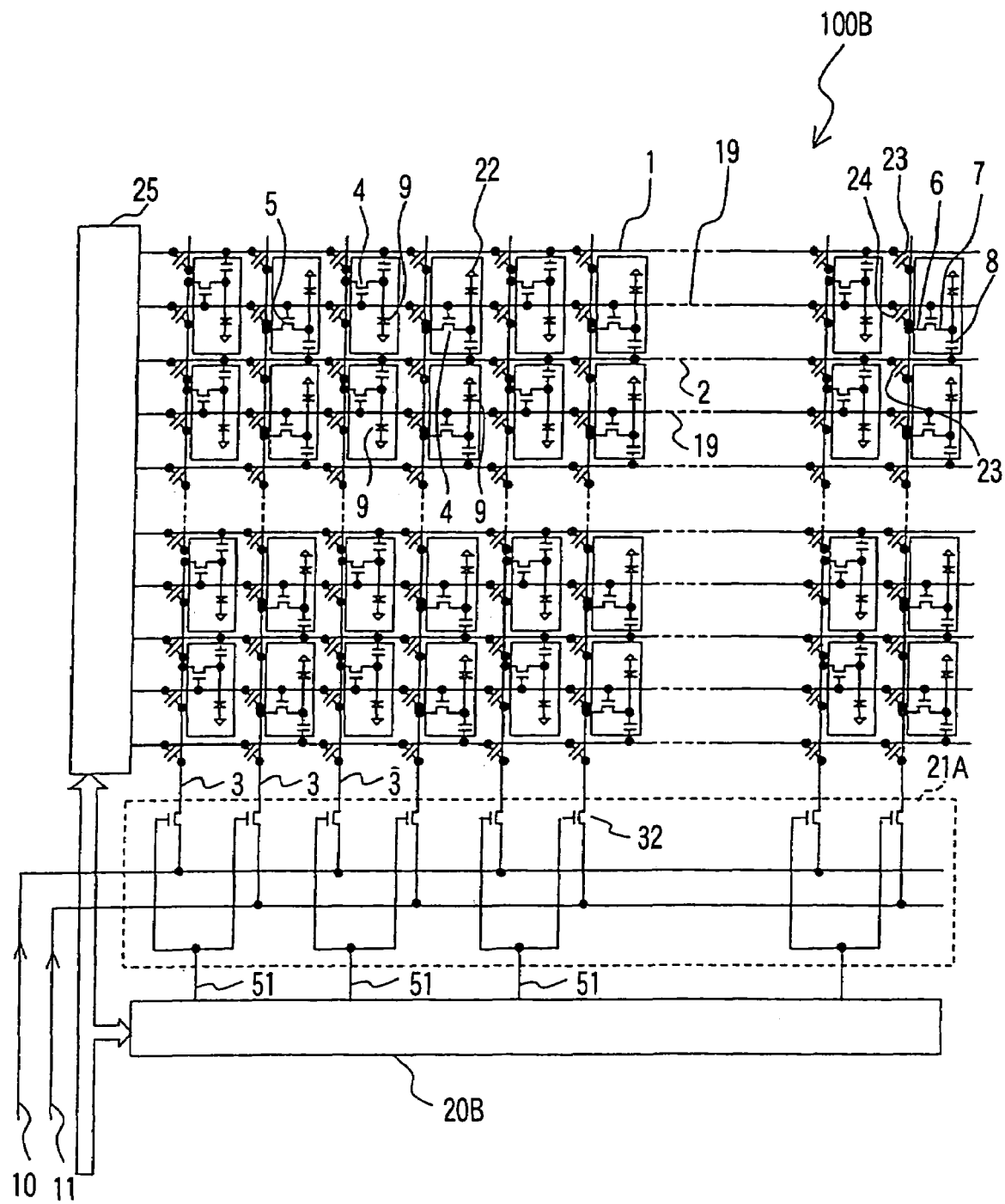
FIG. 6 is a plan view that shows the structure of a flat display device according to Embodiment 3.

FIG. 6 is a plan view showing the structure of a flat display device 100B according to Embodiment 3. The structural components, which coincide with those of the flat display device 100A described in connection with Embodiment 2 with reference to FIG. 4, are denoted by the same reference numerals. Thus, a detailed description of these structural components is omitted. The flat display device 100B differs from the previously described flat display device 101A in that the switch circuit 21 is replaced with a switch circuit 21A, and that the source electrode drive circuit 20A is replaced with a source electrode drive circuit 20B.

The switch circuit 21A is provided with a plurality of transistors 32 for applying video signal voltages to the respective source electrodes 3. The drain terminal of each transistor 32 is connected to the associated source electrode 3.

The gate terminals of the transistors 32 are configured such that each two gate terminals of two transistors 32 that are connected to mutually adjacent two source electrodes 3 are commonly connected to a control signal line 51 that is connected to the source electrode drive circuit 20B.

The source terminal of one of the two transistors 32, which are connected to the mutually adjacent two source electrodes 3, is connected to a video signal voltage supply line for supplying a video signal voltage 10. The source terminal of the other of the two transistors 32, which are connected to the mutually adjacent two source electrodes 3, is connected to a video signal voltage supply line for supplying a video signal voltage 11.

Figure 7:
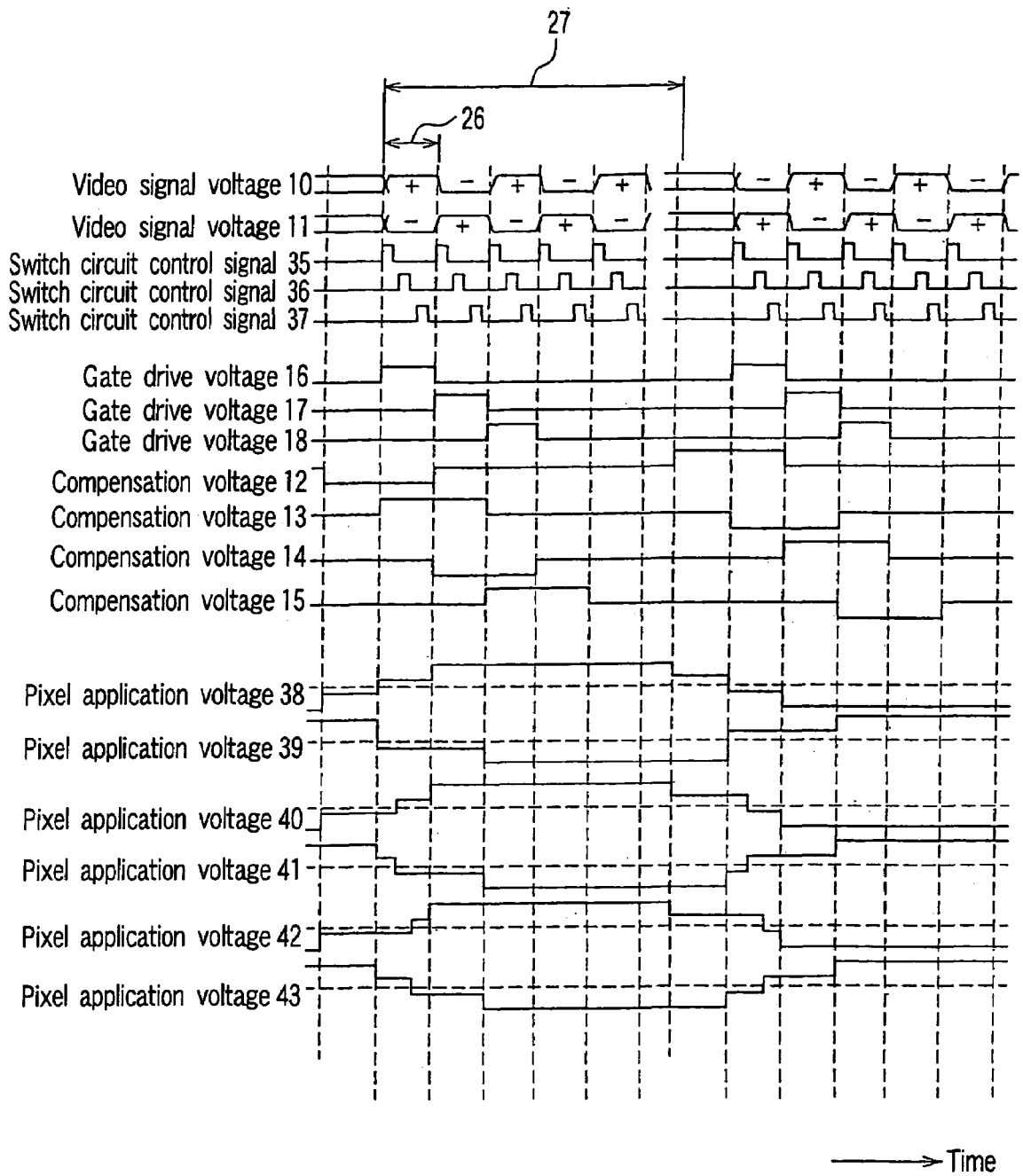
FIG. 7 is a waveform diagram for explaining the operation of the flat display device according to Embodiment 3.
Figure 8:
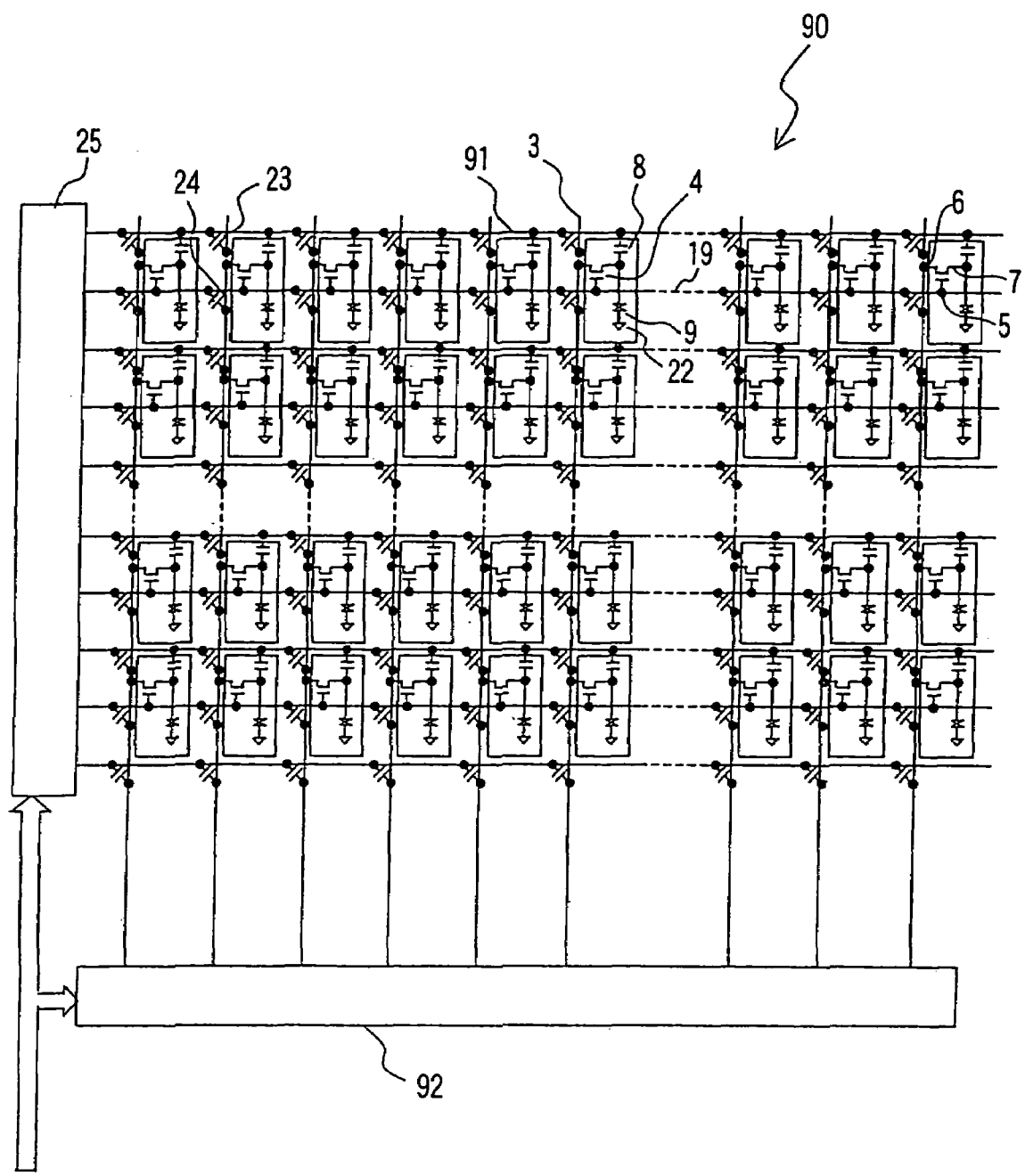
FIG. 8 is a plan view that shows the structure of a prior-art flat display device.
Figure 9:
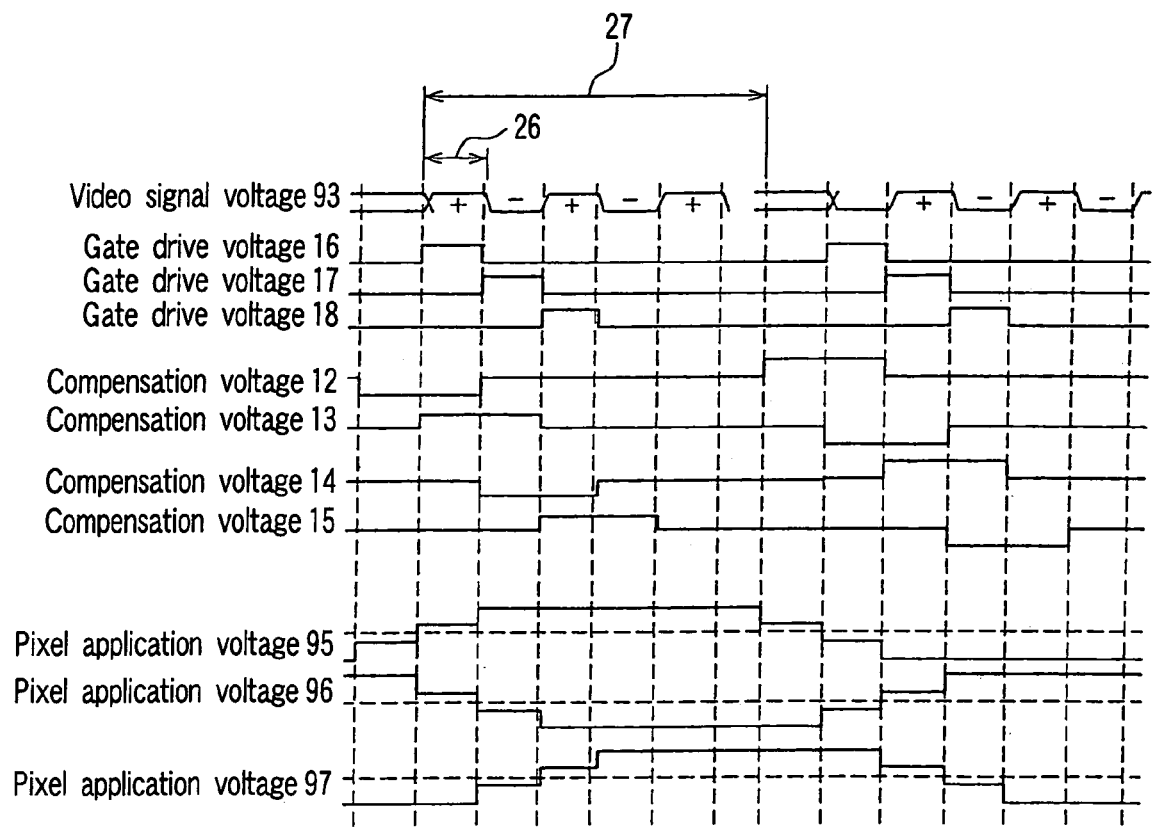
FIG. 9 is a waveform diagram for explaining the operation of the prior-art flat display device.

FIG. 7 is a waveform diagram for illustrating the operation of the flat display device 100B according to Embodiment 3. The structural components, which coincide with those in the above-described waveform diagrams of FIG. 2 and FIG. 5, are denoted by the same reference numerals. Thus, a detailed description of these structural components is omitted.

The polarity of the video signal voltage 10 alternately changes for each horizontal sync period 26. Like the video signal voltage 10, the polarity of the video signal voltage 11 alternately changes for each horizontal sync period 26. The video signal voltage 10 and video signal voltage 11 have mutually different voltage polarities in the same horizontal sync period 26.

The switch circuit control signal 35, switch circuit control signal 36, and switch circuit control signal 37, which are output from the source electrode drive circuit 20B via the control signal lines 51, are associated for time-division drive (multiplex drive) of the source electrodes 3. Specifically, the switch circuit control signal 35 is first turned on during the horizontal sync period 26. After the switch circuit control signal 35 is turned off, the switch circuit control signal 36 is then turned on. After the switch circuit control signal 36 is turned off, the switch circuit control signal 37 is then turned on. Thus, the video signal voltage 10 and video signal voltage 11 are simultaneously applied to each two mutually adjacent source electrodes 3.

As for the compensation voltage 12 applied to the storage capacitance electrode 1, the compensation voltage 13 applied to the storage capacitance electrode 2, the compensation voltage 14 applied to the other storage capacitance electrode 1 and the compensation voltage 15 applied to the other storage capacitance electrode 2, their voltage polarities are reversed on a line-by-line basis for scanning. The polarities of the compensation voltage 12, compensation voltage 13, compensation voltage 14 and compensation voltage 15 are reversed from frame period 27 to frame period 27.

The voltage polarities of the pixel application voltage 38, pixel application voltage 39, pixel application voltage 40, pixel application voltage 41, pixel application voltage 42 and pixel application voltage 43, which are applied to the liquid crystal portions 9 that form the pixels in one line, are varied from line to line. In order that the respective liquid crystal portions 9 may execute an effective-value response, the pixel application voltage 38, pixel application voltage 39, pixel application voltage 40, pixel application voltage 41, pixel application voltage 42 and pixel application voltage 43 are made to have equal voltage effective values.

The gate drive voltage 16, gate drive voltage 17 and gate drive voltage 18, which are applied to the respective gate electrodes 19 that are disposed to extend in the horizontal direction, spaced from each other at predetermined intervals, and connected to the gate terminals 5 of the respective thin-film transistors 4, are successively turned on for each horizontal sync period 26.

If the gate drive voltage 16 is turned on, the video signal voltage 10 and video signal voltage 11 are applied to the storage capacitance elements 8 and liquid crystal portions 9 via the thin-film transistors 4 that have the gate terminals 5 supplied with the gate drive voltage 16.

Next, if the compensation voltage 12 rises from the low level to the intermediate level, a difference voltage of the compensation voltage 12 is superimposed on the pixel application voltage 38 that is applied to the liquid crystal portion 9 that forms the pixel. The voltage value of the pixel application voltage 38, on which the difference voltage of the compensation voltage 12 is superimposed, is retained.

In Embodiments 1 to 3, the thin-film transistors 4 and transistors 34 are N-channel transistors. Alternatively, these transistors may be P-channel transistors, or transistors of a CMOS structure.

As has been described above, the present invention can provide a flat display device with a uniform, good display quality.

What is claimed is:

1. A flat display device comprising:
   a plurality of pixels arranged substantially in a matrix;
   a plurality of thin-film transistors that are provided to drive the respective pixels;
   a plurality of gate electrodes that are disposed to extend in a horizontal direction, spaced from each other at predetermined intervals, and connected to gate terminals of the thin-film transistors;
   a plurality of source electrodes that are disposed to extend in a vertical direction, spaced from each other at predetermined intervals, and connected to source terminals of the thin-film transistors;
   a plurality of storage capacitance elements that are connected to drain terminals of the thin-film transistors and to the pixels;
   a plurality of first storage capacitance electrodes that are disposed to extend in the horizontal direction, spaced from each other at predetermined intervals, and connected to one part of the pixels via the storage capacitance elements; and
   a plurality of second storage capacitance electrodes that are disposed to extend in the horizontal direction, spaced from each other at predetermined intervals, and connected to the other part of the pixels via the storage capacitance elements;
   wherein a first compensation voltage applied to each of the first storage capacitance electrodes has a voltage polarity different from that of a second compensation voltage applied to each of the second storage capacitance electrodes, and a video signal voltage applied via the source electrode to the source terminal of the thin-film transistor which is included in the thin-film transistors connected to the same gate electrode and is connected to the first storage capacitance electrode via the storage capacitance element has a voltage polarity different from that of a video signal voltage applied via the source electrode to the source terminal of the thin-film transistor which is connected to the second storage capacitance electrode via the storage capacitance element.

2. The flat display device according to claim 1, further comprising a source electrode drive circuit that is provided to apply the video signal voltages to the source electrodes.

3. The flat display device according to claim 2, wherein the source electrode drive circuit is configured to drive the respective source electrodes in a time-division manner.

4. The flat display device according to claim 2, wherein the source electrode drive circuit is configured to simultaneously apply the video signal voltages in units of a plural number of source electrodes.

5. The flat display device according to claim 2, further comprising a switch circuit that is provided to sequentially apply a video signal voltage to the source terminal of the thin-film transistor connected to the first storage capacitance electrode, and a video signal voltage to the source terminal of the thin-film transistor connected to the second storage capacitance electrode.

6. The flat display device according to claim 5, wherein the switch circuit is configured to receive video signal voltages from the source electrode drive circuit, and sequentially apply the video signal voltages to decrease the number of times the voltage polarities of the video signal voltages are switched.

7. The flat display device according to claim 5, wherein the switch circuit is configured to receive video signal voltages of different voltage polarities, and sequentially apply the video signal voltages under the control of the source electrode drive circuit.

8. The flat display device according to claim 1, wherein the pixels are disposed in a matrix of P-rows and Q-columns (each of P and Q is an integer of 2 or more), that the first storage capacitance electrodes are disposed to have connections with the pixels arranged in the 2N-th row ($1 \leq N \leq (P-1)/2$) and with the pixels arranged in the (2N+1)-th row, and that the second storage capacitance electrodes are disposed to have connections with the pixels arranged in the (2N−1)-th row and to the pixels arranged in the 2N-th row.

9. A flat display device comprising:
   a display area that includes a plurality of pixel electrode lines arranged in a vertical direction and each having a plurality of pixel electrodes arranged in a horizontal direction;
   a plurality of thin-film transistors that are provided to drive the pixels;
   a plurality of gate electrodes that are connected to gate terminals of the thin-film transistors and disposed substantially in parallel with each other to extend along the pixel electrode lines;
   a plurality of source electrodes that are connected to drain terminals of the thin-film transistors and disposed substantially in parallel with each other to extend in the vertical direction;
   a plurality of storage capacitance elements having one ends connected to the source terminals of the thin-film transistors; and
   a plurality of storage capacitance element lines that are connected to the other ends of the storage capacitance elements and disposed substantially in parallel with each other to extend along the pixel electrode lines;
   wherein each storage capacitance element line is connected to the storage capacitance elements corresponding to the pixel electrodes that are alternately selected from different pixel electrode lines in units of a predetermined number of pixel electrodes arranged along each pixel electrode line.

10. The flat display device according to claim 9, wherein each storage capacitance element line is connected to the storage capacitance elements corresponding to the pixel electrodes that are alternately selected from different pixel electrode lines in units of a single pixel electrode along each pixel electrode line.

11. The flat display device according to claim 9, wherein each storage capacitance element line should be connected to the storage capacitance elements that correspond to the pixel electrodes that are alternately selected from different pixel electrode lines sides in units of a plurality of pixel electrodes along each pixel electrode line.

12. The flat display device according to claim 9, wherein voltage signals of different voltage polarities are applied to mutually adjacent ones of the storage capacitance element lines.

13. The flat display device according to claim 12, wherein the voltage signal is a voltage signal for CC-driving the pixel electrodes.

14. The flat display device according to claim 9, wherein each storage capacitance element line is disposed between mutually adjacent ones of the pixel electrode lines.

15. The flat display device according to claim 9, wherein the gate electrode is disposed on a lower side of the pixel electrode.

16. The flat display device according to claim 9, wherein the pixel electrode is disposed over the thin-film transistor via an interlayer insulation film.

17. The flat display device according to claim 9, further comprising a correction circuit that corrects input video data, wherein the correction circuit comprises:

a look-up table that receives the input video data and generates correction video data on the basis of a table in which a predetermined function is set to correct non-uniformity in gradations for the input video data;

a column counter that is reset by a horizontal sync signal and generates an odd-number column/even-number column discrimination signal by counting a dot clock for transferring the input video data; and a selector that selects the corrected video data generated in the look-up table or the input video data, on the basis of the odd-number column/even-number column discrimination signal that is supplied from the column counter, and supplies the selected data to a source electrode drive circuit that is provided to drive the source electrodes.

* * * * *